US012319163B2

(12) United States Patent
Schroth et al.

(10) Patent No.: US 12,319,163 B2
(45) Date of Patent: Jun. 3, 2025

(54) HEAT RETARDING ARRANGEMENT WITH A PHASE CHANGE MATERIAL FOR AN ELECTRIC VEHICLE

(71) Applicant: TE Connectivity Germany GmbH, Bensheim (DE)

(72) Inventors: Lukas Schroth, Bensheim (DE); Uwe Hauck, Berlin (DE); Michael Ludwig, Bensheim (DE); Manuel Eheim, Bensheim (DE); Maik Schaefer, Bensheim (DE); Christopher Muth, Bensheim (DE); Alexander Weber, Bensheim (DE); Markus Eckel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 179 days.

(21) Appl. No.: 17/984,294

(22) Filed: Nov. 10, 2022

(65) Prior Publication Data
US 2023/0141760 A1 May 11, 2023

(30) Foreign Application Priority Data

Nov. 10, 2021 (DE) .......................... 102021129227.1
Nov. 2, 2022 (EP) ..................................... 22205138

(51) Int. Cl.
*H01R 4/64* (2006.01)
*B60L 53/16* (2019.01)
*B60L 53/18* (2019.01)
*B60L 53/302* (2019.01)
*H01R 13/506* (2006.01)
*H01R 13/66* (2006.01)

(52) U.S. Cl.
CPC ............. *B60L 53/302* (2019.02); *B60L 53/16* (2019.02); *B60L 53/18* (2019.02); *H01R 4/646* (2013.01); *H01R 13/506* (2013.01); *H01R 13/6683* (2013.01); *H01R 2201/26* (2013.01)

(58) Field of Classification Search
CPC ........................... B60L 53/302; H01R 13/506
See application file for complete search history.

(56) References Cited

U.S. PATENT DOCUMENTS

| 10,535,940 | B2 * | 1/2020 | Fuehrer | .................. B60L 53/16 |
| 10,833,458 | B2 * | 11/2020 | Sarraf | ...................... G01K 1/18 |
| 2009/0242271 | A1 | 10/2009 | Vetrovee | |
| 2019/0202302 | A1 * | 7/2019 | Turik | ..................... B60L 53/18 |
| 2019/0385765 | A1 | 12/2019 | Lyon | |
| 2020/0395147 | A1 | 12/2020 | Shabgard et al. | |

(Continued)

FOREIGN PATENT DOCUMENTS

| CN | 110040005 A * | 7/2019 | ............. B60L 53/11 |
| DE | 102010050562 B3 | 4/2012 | |

(Continued)

OTHER PUBLICATIONS

JP-2017075773-A (Year: 2017).*

(Continued)

*Primary Examiner* — Mukundbhai G Patel
(74) *Attorney, Agent, or Firm* — Barley Snyder

(57) ABSTRACT

A heat retarding arrangement includes a phase change material. The heat retarding arrangement is attachable at or in an electric conductor and passively cools the electric conductor.

16 Claims, 12 Drawing Sheets

(56) References Cited

U.S. PATENT DOCUMENTS

| | | | |
|---|---|---|---|
| 2021/0021077 A1* | 1/2021 | Mathews | H01R 13/5202 |
| 2021/0347270 A1 | 11/2021 | Cole et al. | |
| 2022/0069508 A1 | 3/2022 | Hashimoto et al. | |
| 2022/0118866 A1* | 4/2022 | Han | B60L 53/302 |

FOREIGN PATENT DOCUMENTS

| | | | | |
|---|---|---|---|---|
| DE | 102016221857 A1 | 5/2018 | | |
| DE | 102018108181 A1 | 10/2019 | | |
| DE | 102020118120 A1 | 2/2021 | | |
| JP | 2017075773 A * | 4/2017 | | F28D 20/02 |
| JP | 2020113448 A | 7/2020 | | |
| WO | 2020150105 A1 | 7/2020 | | |

OTHER PUBLICATIONS

CN-110040005-A (Year: 2019).*
Extended European Search Report from the European Patent Office dated Mar. 31, 2023, corresponding to Application No. 22205138.5-1201, 10 pages.
Chinese Office Action dated Oct. 24, 2023 with English translation, corresponding to Application No. 2022-177842, 12 pages.
Korean Office Action dated May 29, 2024 with English translation, corresponding to Application No. 10-2022-0148741, 16 pages.
German Office Action, Application No. 10 2021 129 227.1, Dated: Jul. 13, 2022, 8 pages.
Korean Office Action dated Jan. 17, 2025, corresponding to Application No. 10-2022-0148741, 4 pages.

* cited by examiner

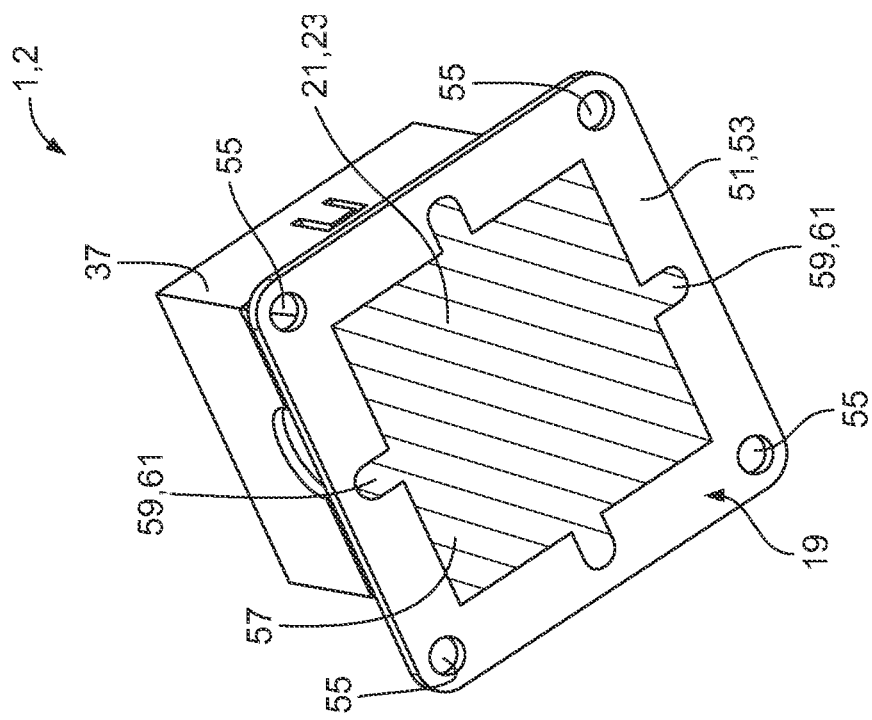
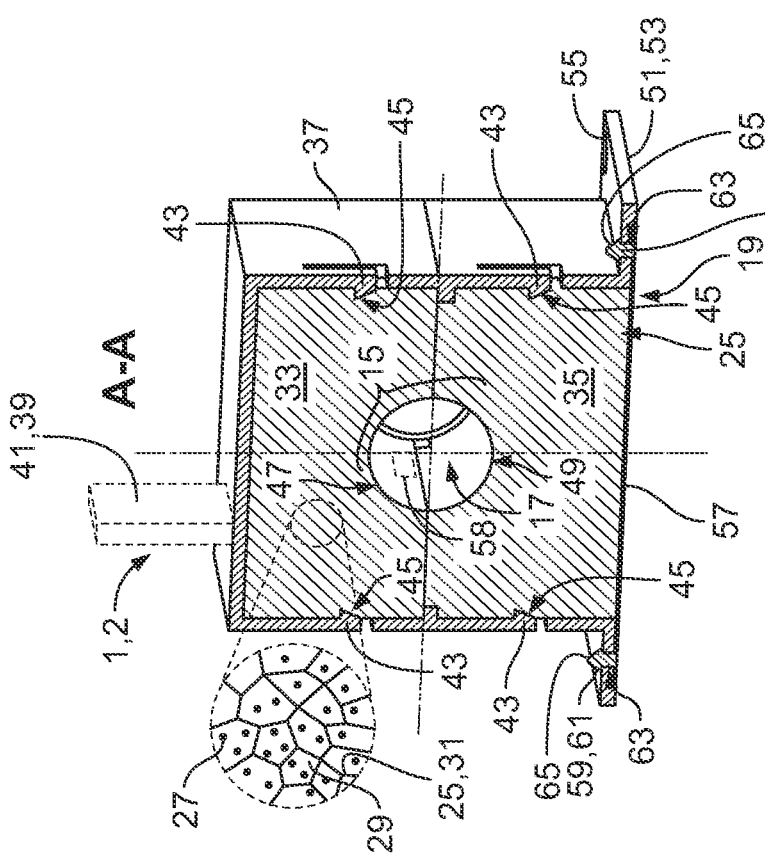

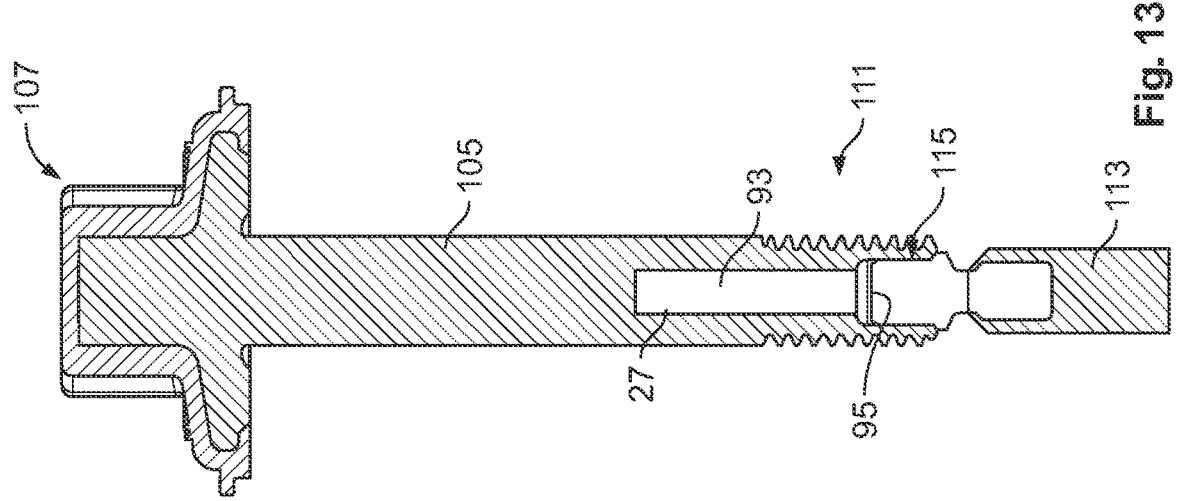
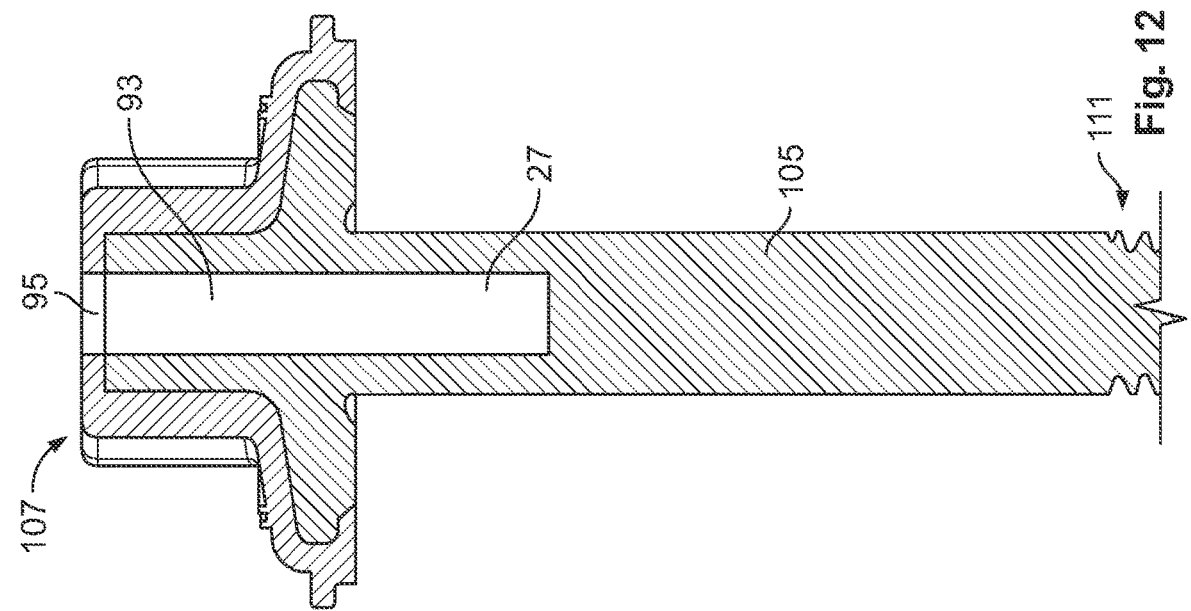

though a hybrid vehicle or a plug-in hybrid vehicle. not relevant a case of application. In the

HEAT RETARDING ARRANGEMENT WITH A PHASE CHANGE MATERIAL FOR AN ELECTRIC VEHICLE

CROSS-REFERENCE TO RELATED APPLICATIONS

This application claims the benefit of the filing date under 35 U.S.C. § 119 (a)-(d) of German Patent Application No. 102021129227.1, filed on Nov. 10, 2021, and European Patent Application No. 22205138.5, filed on Nov. 2, 2022.

FIELD OF THE INVENTION

The invention relates to a heat retarding arrangement for passively cooling an electric conductor at or in an electric vehicle.

BACKGROUND

In electric vehicles, in particular in their electric charge and/or drive circuits, and in connection arrangements, such as charging connectors, high currents can flow or should flow. High currents are desired to permit a quick charging of the vehicle batteries or the provision of sufficient power for operating the vehicle. However, high currents usually lead to a heating of the electric conductors. This can be counteracted by an increase of the conductors' cross-sections. The increase of the conductors' cross-sections, however, is only practicable within certain limits. Larger conductor cross-sections mean an increased material consumption and thus increased costs. Moreover, increased conductor cross-sections of conductors on the vehicle side lead to an increased vehicle weight. This can in turn lead to a reduction of the range.

An active cooling for electric conductors is known. However, the active cooling systems need energy themselves and are moreover technically sophisticated and therefore expensive. It is therefore desirable to provide a solution by which electrical vehicles can be charged and/or operated with high currents without risking the overheating of an electric conductor.

SUMMARY

A heat retarding arrangement includes a phase change material. The heat retarding arrangement is attachable at or in an electric conductor and passively cools the electric conductor.

BRIEF DESCRIPTION OF THE DRAWINGS

The features of the present invention will become more apparent by describing in detail exemplary embodiments thereof with reference to the accompanying drawings, in which:

FIG. 2 is a sectional perspective view of the cable clip of FIG. 1;

FIG. 3 is a perspective view of the cable clip of FIG. 1 showing an abutment section;

FIG. 12 is a detail sectional view of the screw of FIG. 11;

FIG. 13 is a sectional side view of the screw of FIG. 11;

DETAILED DESCRIPTION OF THE EMBODIMENTS

Figure 1:
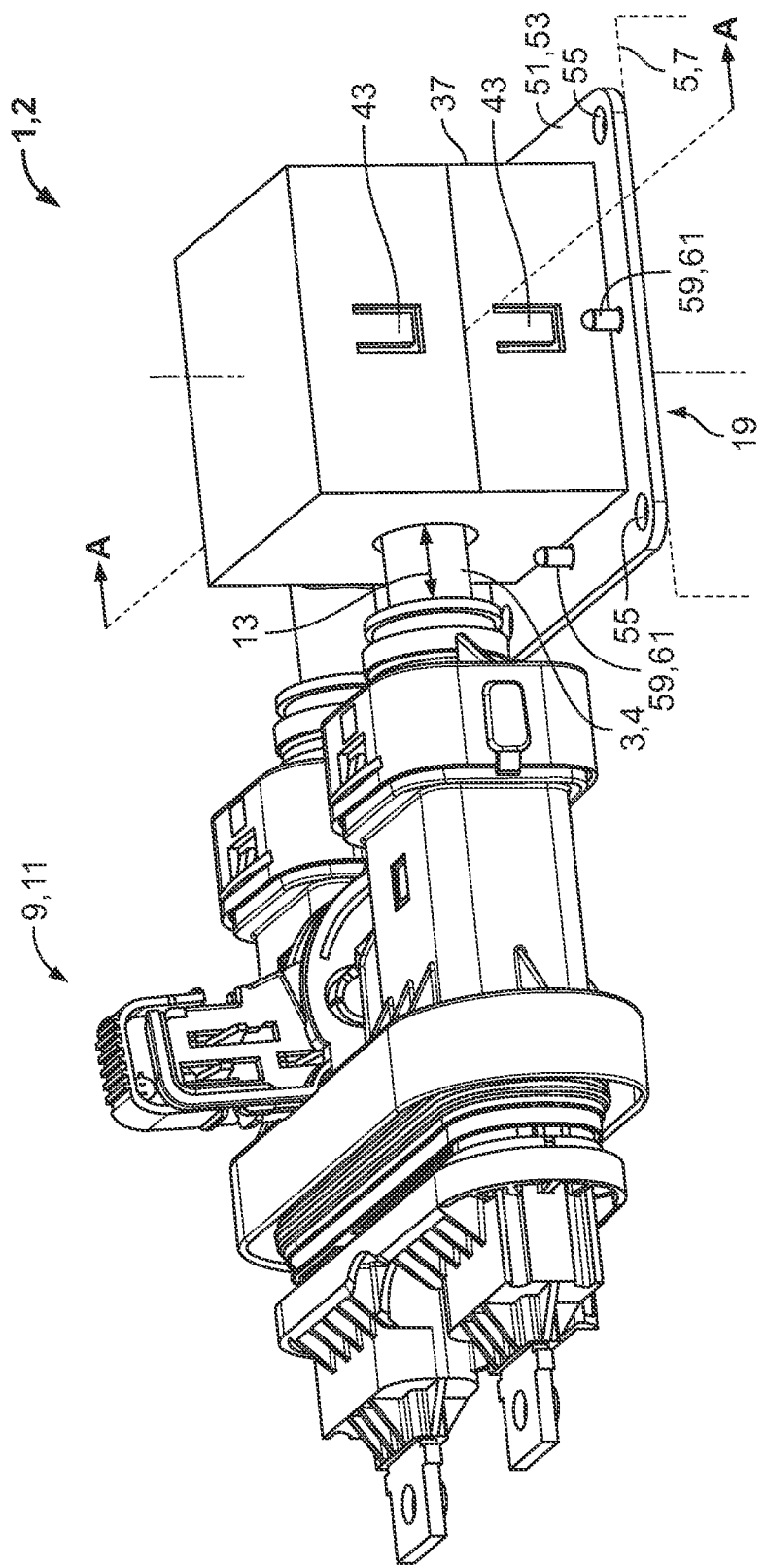
FIG. 1 is a perspective view of a heat retarding arrangement according to an embodiment configured as a cable clip at a cable.

The invention will be described in more detail below by way of example embodiments with reference to the drawings. The combination of features represented by way of example in the embodiments can be supplemented by further features according to the above illustrations corresponding to the properties of the heat retarding arrangement according to the invention for a certain case of application. Moreover, also according to the above illustrations, individual features can be omitted in the described embodiment if the effect of this feature is not relevant in a case of application. In the drawings, the same reference numerals are always used for elements having the same function and/or the same structure.

A first embodiment of a heat retarding arrangement 2 configured as a cable clip 1 is described with reference to FIGS. 1 to 3. The cable clip 1 serves to fasten a cable 3 comprising an electric conductor 4 to an electric vehicle 5 or a part 7 of an electric vehicle 5. The electric vehicle 5 or the part 7 of the vehicle 5 are only indicated in a dashed line in FIG. 1. The part 7 can be, for example, a part of the chassis, the car body, the drive, a battery housing, or another vehicle component. The electric conductor 4 can be, for example, an inner conductor of the cable 3.

The electric vehicle 5 can be a battery-electric vehicle, a fuel-cell vehicle, or else a partially electrically operated vehicle, for example a hybrid vehicle or a plug-in hybrid vehicle. The electric conductor 4 can be part of a cable, for example a battery cable on the vehicle side, i.e. a cable which directly or indirectly connects a charging port on the vehicle side with an energy storage, in particular a battery. As an alternative, the conductor 4 or the cable comprising the conductor can also be part of a high-voltage on-board power supply which, for example, connects the energy storage with the drive unit. Further examples of electric conductors are bus bars, contact elements and sections of contact elements, in particular contact elements in charging ports or charging pistols.

The part 7 of the vehicle 5 to which the heat retarding arrangement 2, in particular the cable clip 1, can be attached can be part of the chassis, the car body, the drive, a battery housing, or another component. The attachment to a battery housing can be advantageous since batteries or their housings often have a cooling system themselves in electric vehicles. Therefore, the heat arising in the cable can be supplied to the cooled battery housing via the heat retarding arrangement 2.

The heat retarding arrangement 2 can be configured to be attachable at or in a conductor 4. Here, it can be directly or indirectly attached at the conductor 4. An indirect attachment can result from the heat retarding arrangement 2 being attached, for example, at a cable that contains the electric conductor 4.

The cable clip 1 for fastening exactly one cable 3 is also represented only by way of example. As an alternative, the cable clip 1 can also be configured to simultaneously fasten a plurality of cables 3.

The cable clip 1 may be arranged near a component 9 that is connected with the cable 3. The component 9 can be a pin-and-socket connector 11, as represented by way of example. As an alternative, other components 9 are also conceivable, in particular a charging port on the vehicle side, a drive unit, a battery or accumulator of the vehicle, a controller or other things.

In an embodiment, a distance 13 of the cable clip 1 to the component 9 shown in FIG. 1 amounts to only a few centimeters, and in an embodiment less than 10 cm. Thereby, heat developed in the component 9 can be conducted via the cable 3 into the cable clip 1 and through the latter to the vehicle 5.

The cable 1 has a cable receiving section 15 configured to receive the cable 3. The cable receiving section 15 can include a passage opening 17 through which the cable 3 can be guided.

The cable clip 1 moreover includes an abutment section 19 configured for the abutment against a part 7 of the vehicle 5. The cable clip 1 is formed in the abutment section 19 which can represent one end of the cable clip 1, for example complementary to the part 7 of the vehicle 5 where the cable clip 1 is to be attached.

In the embodiment represented by way of example, the cable clip 1 is flatly configured in the abutment section 19. This means it can be used for the abutment against a plane surface. As an alternative, other embodiments are also possible. The flat design has the advantage that heat from the cable clip 1 can be conducted to the vehicle 5 over a large abutment surface. The abutment surface 21 in the abutment section 19 may substantially correspond to the cross-sectional area 23 of the cable clip 1. In other words, the cross-section of the cable clip 1 can continuously extend into the abutment section 19.

The cable clip 1 comprises a heat accumulator body 25 with a phase change material 27, as shown in FIG. 2. The phase change material 27 is located within the heat accumulator body 25. The heat accumulator body may have a plurality of spaces 29 or cavities 29 in which the phase change material 27 is located. The spaces 29 can extend continuously through the heat accumulator body 25 or be locally limited. In an embodiment, the heat accumulator body 25 is formed of a material which includes a frame structure 31. The frame structure 31 can span the spaces 29. A frame structure 31 can be formed, for example, from a foamed material. By the heat accumulator body 25, additional mass is moreover admitted to a cable received in the cable clip 1 by which vibrations in the cable can be attenuated.

The phase change material 27 can be configured such that a phase change, for example from the solid to the liquid or from the liquid to the gaseous phase, is accomplished when the temperature of the electric conductor 4 reaches predetermined limits. Due to the phase change, a cooling of the phase change material 27, and thereby also of the electric conductor 4 at or in which the heat retarding arrangement 2 is disposed, is effected. The cooling achieved thereby can be sufficient to be able to maintain a certain intensity of current for an extended period. During a cooling of the phase change material 27, a reversed phase transition can take place so that the phase change material 27 returns to its original state. The heat of the conductor 4 is thereby intermediately stored or buffered. The heat retarding arrangement 2 can be alternatively referred to as heating retarding arrangement or as thermal accumulator arrangement. The heat retarding arrangement 2 can here operate according to the principle of a PCM device. The heat retarding arrangement 2 can thus retard the heating of the electric conductor 4. By the solution according to the invention, an active cooling of the electric conductor 4 can be omitted.

The heat retarding arrangement 2 can operate, in particular if it is attached in a conductor 4, according to the principle of a heat pipe. At a point where the heat retarding arrangement 2 is heated, a phase transition, also referred to as phase shift or phase change, can take place for the phase change material 27 as of a defined temperature, for example, from the solid state to the liquid state or from the liquid state to the gaseous state. In the process, thermal energy is withdrawn from the phase change material 27. At another point of the heat retarding arrangement, a reversed phase transition can take place. For example, the liquid phase change material can solidify again, or a gaseous phase change material can condense again and return to the liquid state. In the process, the thermal energy is released again. By a transport of the phase change material 27 within the heat retarding arrangement 2, for example by capillary forces, the liquid phase change material 27 can return again to the original place. Thereby, a heat retarding arrangement 2 with a phase change material can be permanently operated passively as a cooling element or at least as a thermal conductor. By the embodiment as a heat pipe, the heat is therefore not only retarded but also carried off from the place where it arises.

Due to the heat retarding or cooling effect of the heat retarding arrangement 2, it is connected with those conductors or cables that probably heat up due to the current flow and where a heat development is not desired at least as of a certain degree. This can be the case in particular in cables where the heat development does not only lead to inefficient charging, but also to the charging current having to be reduced for safety reasons.

The phase change material 27 can contain only, for example, paraffin and/or sodium. Other materials or combinations of materials are also possible.

The principle of the PCM device is not only advantageous for cooling a cable received in the cable receiving section 15 by a phase transition of the phase change material 27 from solid to liquid or liquid to gaseous, but also offers altogether a good heat conduction and can conduct heat from the cable receiving section 15 to the abutment section 19.

In an embodiment, the heat retarding arrangement 2 is configured to be attached at a part of the vehicle 5. The heat retarding arrangement 2 can not only buffer the heat of the conductor 4, but also discharge at least a portion of the heat to the vehicle 5 by forwarding the heat to the part of the vehicle 5 where it is attached. The vehicle 5 can thus serve as a heat sink.

The temperatures at which the phase transitions take place can be defined by a suited material selection of the material for the heat accumulator body 25 and for the phase change material 27 and by the pressure prevailing inside the heat accumulator body 25. In case of a phase change material 27 which undergoes, during the operation of the cable clip 1, phase transitions from the solid to the liquid phase and vice versa, the condensation of the phase change material 27 may be effected near the cable receiving section 15, and the solidification near the abutment section 19. In case of a phase change material 27 which undergoes, during the operation of the cable clip 1, phase transitions from the liquid to the gaseous phase and vice versa, evaporation is correspondingly effected near the cable receiving section 15, and condensation near the abutment section 19.

As an alternative, channels as spaces 29 in which the phase change material 27 is located can also pass through the heat accumulator body. A further alternative can be that the heat accumulator body 25 consists of a composite material which contains the phase change material 27 as a component.

The heat accumulator body 25 may have a multi-piece design, in particular a two-piece design. In the embodiment shown in FIG. 2, the heat accumulator body 25 includes two half bowls 33 and 35 which can be arranged one lying against the other. Between the half bowls 33 and 35, there is the cable receiving section 15 with the passage opening 17.

In particular in an embodiment with a multi-piece heat accumulator body 25, the cable clip 1 can comprise a housing 37 in which the heat accumulator body 25 is accommodated. The housing 37 can be formed of a plastic, a metal, in particular aluminum, or another material. As an alternative, other materials, for example, composite materials, ceramics, silicone containing materials or others, are also possible. A housing of plastic has the advantage that the housing can be manufactured quickly and inexpensively. A housing of metal has the advantage that, depending on the metal, it intrinsically has a high thermal conductivity and can thereby contribute to heat conduction and also to the dissipation of heat to the surrounding area. A metallic housing may be formed of a light metal or a light metal alloy. In an embodiment, the housing 37 is formed of aluminum or an aluminum alloy.

A further alternative can naturally be that the cable clip 1 is formed without housing 37. The housing 37 can be provided with at least one passive cooling structure 39 (indicated in a dashed line in FIG. 2), in particular with a cooling fin 41. The cooling fin 41 can be formed at the housing 37. The latter can be the case in particular in a housing of a metal, for example, aluminum. The at least one cooling structure 39 can dissipate heat to the surrounding area, in particular to the surrounding air. As an alternative, the at least one passive cooling structure 39 can also be part of the heat accumulator body 25. The housing 37 can then extend around this cooling structure or expose it.

To securely fasten the two parts, or the half bowls 33 and 35 of the heat accumulator body 25, the housing 37 may include a plurality of locking elements configured as locking hooks 43 which can engage with locking recesses 45 in the half bowls 33 and 35 configured complementarily to it, and can secure them in the housing 37. For example, initially, the half bowl 33 can be inserted into the housing 37 to such an extent that the locking hooks 43 are arranged in the locking recesses 45. Subsequently, the cable 3 can be inserted so that it is arranged in the cable receiving section 15. Finally, the second half bowl 35 can be inserted. Since both half bowls 33 and 35 are each provided with a conduit-like recess 47 or 49, respectively, which together form the passage opening 17 in an assembled state, the cable 3 is held between both half bowls 33 and 35 in the cable clip 1 in the assembled state.

To fasten the cable clip 1 at the vehicle 5, and thereby indirectly fasten the cable 3 at the vehicle 5, the cable clip 1 may have at least one fastening element 51. The fastening element 51 can be configured to fasten the heat retarding arrangement 2 to the vehicle 5, for example by a threaded joint, a locking, or an adhesive joint. In the embodiment represented by way of example, the fastening element 51 is a flange 53. The flange 53 is provided with a plurality of passage bores 55. Fastening parts, for example screws or clips, can be guided through them to hold the cable clip 1 at the vehicle 5.

To improve the heat conduction between the heat accumulator body 25 and the vehicle 5, or to ensure a continuous abutment of the cable clip 1 at the vehicle 5, the cable clip 1 includes a heat conducting element 57 which is preferably arranged at the abutment section 19. The heat conducting element 57 can be a heat conducting pad, a layer of heat conducting adhesive, a layer of heat conducting paste, or another suited element.

The housing 37 can be opened in the abutment section 19 to have the heat accumulator body 25 abut directly or, via the heat conducting element 57 indirectly, against the vehicle 5. As an alternative, the housing 25 can also be closed in the abutment section 19. This can be the case, for example, with a housing 37 of a metal. A closed housing can be advantageous if the heat retarding arrangement 2 does not comprise a solid heat accumulator body 25 and if it has to be ensured that liquid or gaseous phase change material does not leak. If the cable clip 1 is provided with a heat conducting element 57, it can be arranged outside at the housing 37 at the abutment section 19. The heat conducting element 57 may be deformable plastically and/or elastically. Thereby, during assembly, it can be pressed into spaces between the cable clip 1 and the part 7 of the vehicle 5 where the cable clip 1 abuts, and seal these spaces in a heat conducting manner.

To fasten a heat conducting element 57, it can include, for example, fastening elements 59 projecting towards the cable receiving section 15, for example elastically deformable locking hooks 61 which project through passage openings 63 in the housing 37, in particular in the flange 53, and are secured against slipping out by a thickened end 65. As an alternative, the heat conducting element 57 can also be glued onto the rest of the cable clip 1, or be fastened thereto in another suited manner.

At least one further heat conducting element 58 (indicated in a dashed line in FIG. 2) can be arranged in the cable receiving section 15 to contribute to the heat conduction between a cable 3 in the cable receiving section 15 and the heat accumulator body 25.

Figure 4:
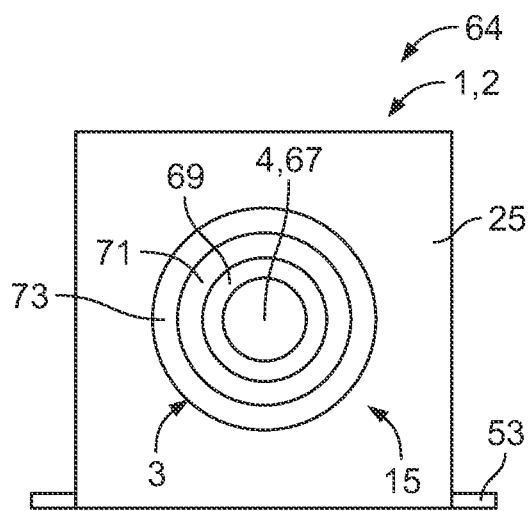
FIG. 4 is a sectional plan view of a cable clip and a cable according to an embodiment.

Below, reference is made to FIG. 4. In FIG. 4, a heat retarding arrangement 2 configured as a cable clip 1 is only indicated, wherein the cable clip 1 can in particular correspond to the embodiment described with reference to FIGS. 1 to 3. The cable clip 1 and the cable 3 together form an arrangement 64. The representation shows a section which corresponds to the sectional axis marked with A-A in FIG. 1. A cable 3 is also shown in a sectional representation.

The cable 3 has an inner conductor 67, an inner insulation 69 surrounding the inner conductor 67, a shield 71 surrounding the inner insulation 69, and an outer insulation 73 surrounding the shield 71, as shown in FIG. 4. In this embodiment, the heat accumulator body 25 abuts against the outer insulation 73. This embodiment is advantageous because no changes have to be made to the cable 3. This can facilitate the assembly of the cable clip 1. However, the fact that heat generated in the inner conductor 67 has to pass through a plurality of layers of the cable 3 before it reaches the heat accumulator body 25 can here also have a negative effect.

Figure 5:
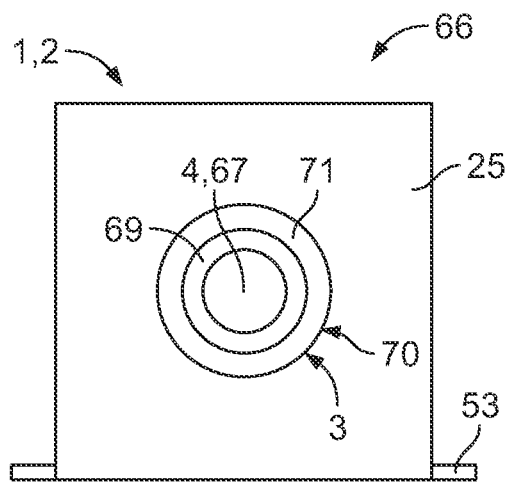
FIG. 5 is a sectional plan view of a cable clip and a cable according to another embodiment.

An alternative embodiment of an arrangement comprising a cable clip 1 and a cable 3 will be described below with reference to FIG. 5. To keep the description short, only the differences to the embodiment described with reference to FIG. 4 will be discussed. In the arrangement 66, the cable 3 does not have any outer insulation 73, at least in the section 70 where it passes through the cable clip 1. In an embodiment, it substantially is a cable 3 as described with reference to FIG. 4, however, the outer insulation 73 is removed in the section 70 where it extends through the cable clip 1. The heat accumulator body 25 of the cable clip 1 consequently directly abuts against the shield 71.

This arrangement permits a better heat conduction from the inner conductor 67 into the heat accumulator body 25 since the outer insulation 73 is missing. Moreover, the heat accumulator body 25 in direct contact with the shield 71 can contribute to the electromagnetic shielding and interference suppression, in particular if the heat accumulator body 25 is formed of a suited material, in particular an electrically conductive one.

The arrangement 66 can, as an alternative to the above-described embodiment, comprise a heat retarding arrangement 2 which is not configured as a cable clip 1, instead of the cable clip 1.

Figure 6:
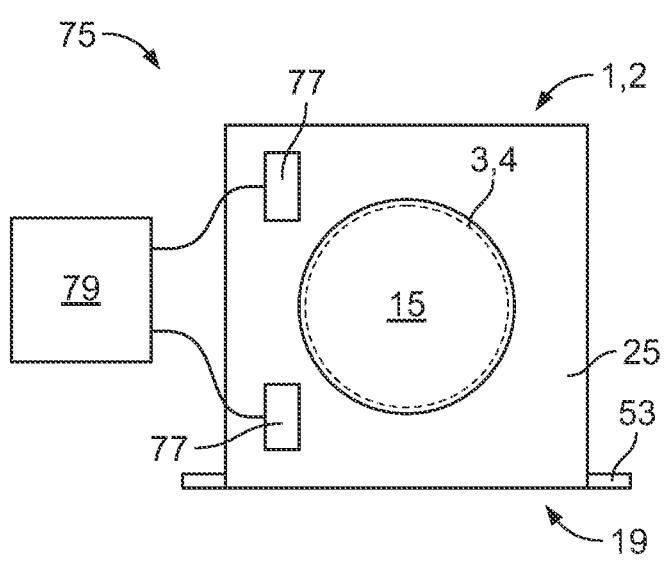
FIG. 6 is a schematic view of a heat retarding arrangement configured as a cable clip with temperature sensors.

Below, a further advantageous embodiment of a cable clip 1 and a further advantageous arrangement 75 will be briefly discussed. The cable clip 1 can be structured as the cable clips 1 described above. The arrangement 75, too, can, as an alternative to the cable clip 1, comprise a heat retarding arrangement 2 which is not configured as a cable clip 1. The difference to the above-described embodiments of the cable clip 1 is that the heat accumulator body is provided with two temperature sensors 77 which are embedded in the material of the heat accumulator body 25 spaced apart from each other, as shown in FIG. 6. Both temperature sensors 75 are connected with a control unit 79 in a data transmitting manner. The cable clip 1 forms the arrangement 75 together with the control unit 79.

The control unit 79 can be configured to control a current flow through a cable 3 arranged in the cable receiving section (only represented in a dashed line in FIG. 6). By the data received from the temperature sensors 77, the temperature flow within the heat accumulator body 25 can be determined. In particular, a difference measurement of the temperatures through the two sensors 77 can be performed.

In an embodiment, the control unit 79 is connected with a storage unit, a non-transitory computer-readable storage medium, which stores at which temperatures a phase transition takes place in the phase change material or in a heat accumulator body 2 including the phase change material 27. On the basis of the knowledge of an imminent phase transition, the control unit 79 can control the charging current. Since thermal energy is dissipated during the first phase transition, for example from solid to liquid or liquid to gaseous, the charging current can be correspondingly high since the overheating of the conductor or other components of the vehicle 5 can still be prevented.

By the data obtained from the temperature sensors 77, it can be possible to predict a phase transition of the phase change material 27 located in the heat accumulator body 25 and to correspondingly adjust the current flow through the cable 3. If such a calculation shows, for example, that the temperature in the heat accumulator body 25 has not yet reached a phase transition temperature, one can do without reducing the current flow through the cable 3, or the current flow through the cable 3 can even be increased because it is known that the phase transition in the phase change material 27 has a cooling effect on the heat accumulator body 25 and thus indirectly on the cable 3.

By this embodiment, the maximally possible charging current during the charging of an electric vehicle can be predicted by calculation and exhausted without reaching a dangerous temperature trail above admissible limits and thus risking to overheat the conductor and components connected therewith.

Figure 7:
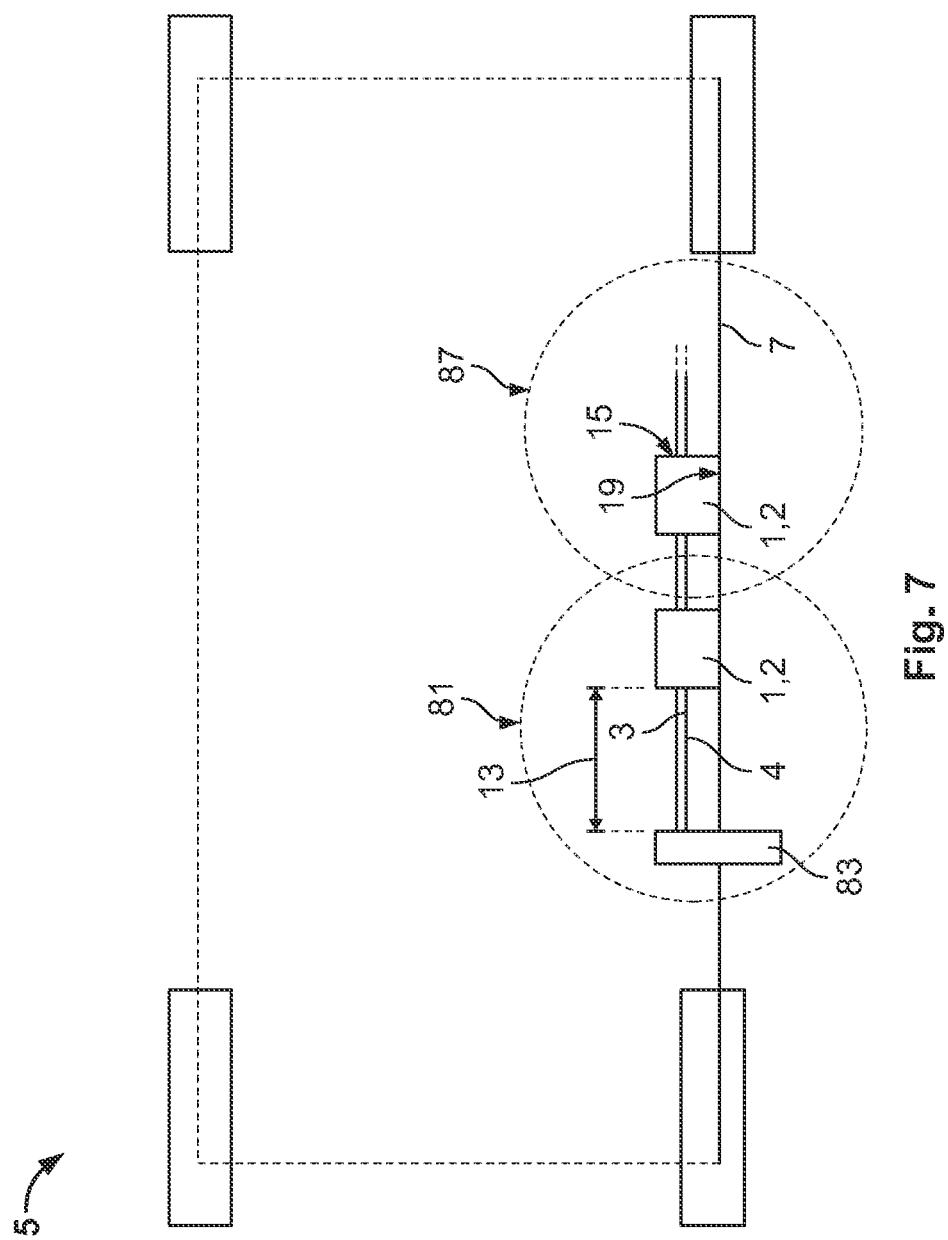
FIG. 7 is a schematic view of an arrangement with heat retarding arrangements according to another embodiment.

Below, two further advantageous arrangements each comprising a heat retarding arrangement 2 configured as a cable clip 1 will be briefly described with reference to FIG. 7. FIG. 7 schematically shows a vehicle 5 from above.

An arrangement 81 comprises a charging port 83 on the vehicle side, a cable 3, and a cable clip 1. The charging port 83 is here a further example of a component 9. The cable 3 as a battery cable can connect, for example, the charging port 83 with traction batteries.

The charging port 83 can extend from a region outside a vehicle 5 into the interior of the vehicle 5. The cable 3 is connected to the charging port 83 in a current-transmitting manner. A cable clip 1 which is to connect the cable 3 with a part 7 of the vehicle 5 may be arranged at a distance 13 to the charging port 83 which may be less than 10 cm. In this manner, the cable clip 1 can indirectly remove heat from the charging port 83 via the cable 3. As part 7 of the vehicle, the car body is represented only by way of example. Of course, the cable clip 1 can also be attached to any other interior part of the vehicle 5.

A further cable clip 1 by which the cable 3 is fastened to the vehicle 5 is also represented only by way of example. The vehicle 5 can be provided with any number of cable clips 1 to secure the cable 3 sufficiently against movements, in particular vibrations, and to dissipate heat from the cable 3.

A further arrangement 87 represented in FIG. 7 comprises a heat retarding arrangement 2 configured as a cable clip 1, a part 7 of the vehicle 5, optionally the complete vehicle 5, and the cable 3, wherein the cable 3 is received in the cable receiving section 15 of the cable clip 1 and the cable clip 1 abuts against the part 7 of the vehicle 5 with its abutment section 19.

Figure 8:
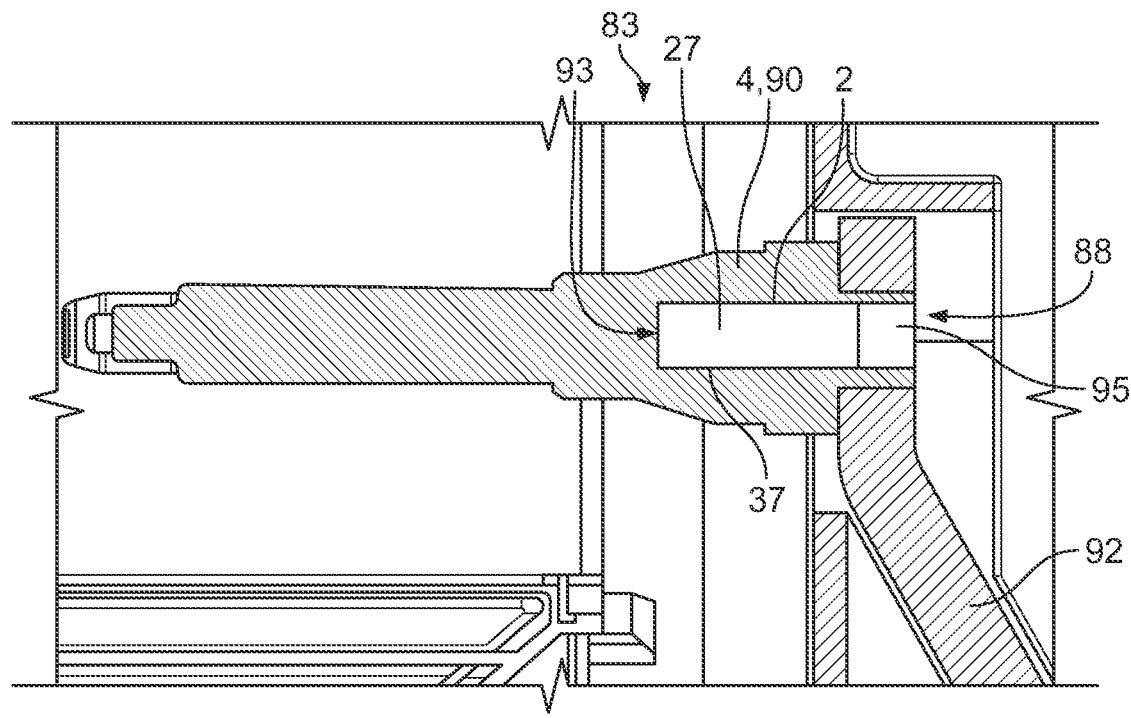
FIG. 8 is a sectional side view of a heat retarding arrangement according to an embodiment in a charging port.

In FIG. 8, an arrangement 88 is shown wherein a heat retarding arrangement 2 according to the invention is arranged in an electric conductor 4. The electric conductor 4 is a contact element 90 which can be part of a charging port 83 of the vehicle 5. The contact element 90 is connected with a bus bar 92 in an electrically conductive manner so that the contact element 90 and the bus bar 92 together form an electric conductor 4. There is a cavity 93 in the contact element 90 in which the heat retarding arrangement 2 is accommodated.

In the simplest case, the heat retarding arrangement 2 only comprises the phase change material 27 in this arrangement.

The phase change material 27 can be, for example, filled or placed in the cavity 93, and the cavity 93 can be subsequently sealed. To this end, one end of the cavity 93 that is originally open to the outside can be sealed to the outside with a cap 95.

As an alternative, the heat retarding arrangement 2 can also include a housing 37 in which the phase change material 27 is accommodated. The heat retarding arrangement 2 with the housing 37 can be formed, for example, as an insert for the cavity 93. For assembly, the heat retarding arrangement 2 can be pushed, for example, into the cavity 93.

Figure 9:
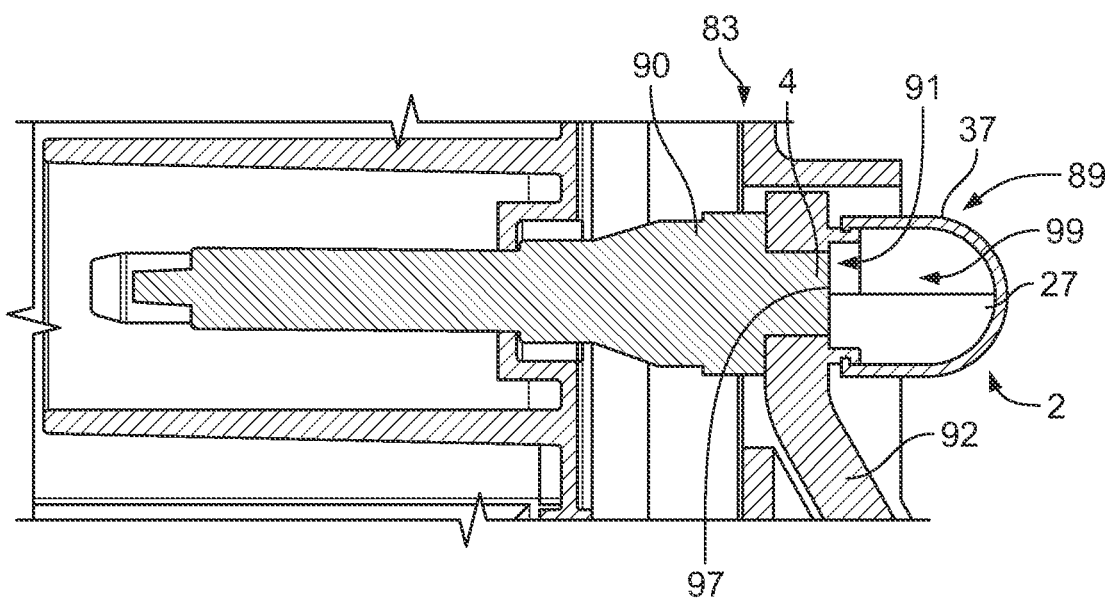
FIG. 9 is a sectional side view of a heat retarding arrangement according to another embodiment in a charging port.

Below, FIG. 9 will be briefly discussed. Here, too, a heat retarding arrangement 2 according to the invention is used for passively cooling a contact element 90 of a charging port 83. The heat retarding arrangement 2 comprises the phase change material 27 and a rubbery-elastic housing 37. The electric conductor 4, consisting of the bus bar 92 and the contact element 90, is provided with a receptacle 91. The phase change material 27 is received partially within the receptacle 91 and partially within the housing 37.

A wall 97 in the electric conductor 4 defining the receptacle 91 and the housing 37 form a common cavity 99 in which the phase change material 27 is accommodated. Due to the rubbery-elastic design of the housing 37, the housing 37 can compensate volume changes of the phase change material 27. Volume changes can in particular be caused by the phase transitions in the phase change material.

Figure 10:
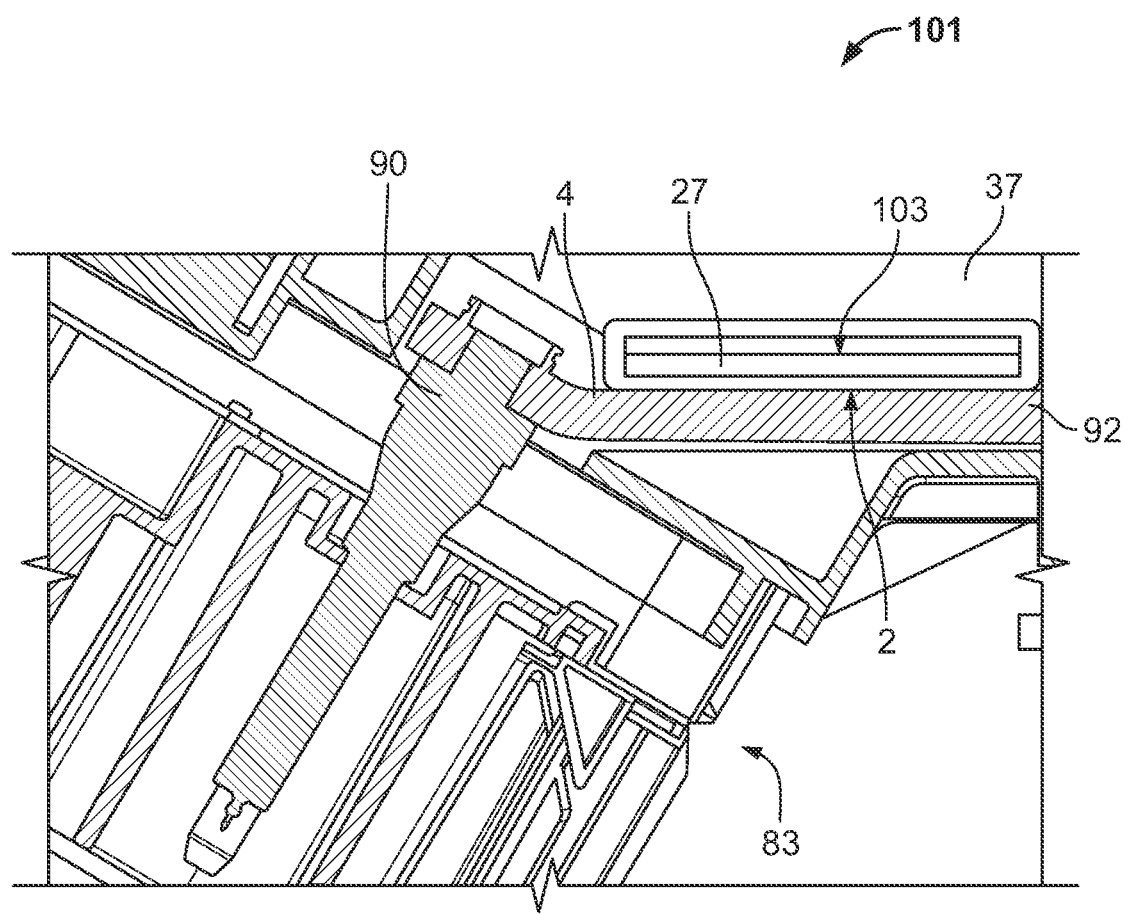
FIG. 10 is a sectional side view of a heat retarding arrangement according to an embodiment at an electric conductor.

Below, FIG. 10 will be discussed in which a further arrangement 101 with a heat retarding arrangement 2 according to the invention is represented. The arrangement 101 also comprises a contact element 90 of a charging port 83, wherein the contact element 90 is connected with a bus bar 92 in an electrically conductive manner. The heat retarding arrangement 2 according to the invention is here arranged to abut against the bus bar 92 and does not necessarily contact the contact element 90.

The arrangement at the bus bar 92 can facilitate assembly and/or make sense if there is not sufficient installation space at the contact element 90. By the contact element 90 being electrically conductively connected with the bus bar 92, depending on the selection of the employed conductive materials, it is usually also connected with the bus bar 92 in a heat conducting manner. Heat generated in the contact element 90 can therefore be conducted to the heat retarding arrangement 2 via the bus bar 92. The heat retarding arrangement 2 is arranged in the shown embodiment on the bus bar 92 at a small distance to the contact element 90. The distance may be only a few centimeters, for example maximally 10 cm.

The heat retarding arrangement 2 of this embodiment also has a rubbery-elastic housing 37. This can be the case, for example, if the housing 37 consists of silicone material. A housing 37 expandable in a rubbery-elastic manner can expand or contract to follow a volume change of the phase change material 27 during a phase transition. It can be prevented thereby that an excess or negative pressure arises in the housing 37 by which the housing 37 becomes leaky. Another advantage of a rubbery-elastic housing 37 is the increased overall volume of the phase change material 27 that can be accommodated.

In contrast to the embodiment described with reference to FIG. 9, the housing 37 is here, however, closed all around. The heat retarding arrangement 2 can be considered as a kind of pad which can be attached to the bus bar 92. The housing 37 has an inner space 103 in which the phase change material 27 is accommodated. As in the embodiment described with reference to FIG. 9, the rubbery-elasticity of the housing 37 can absorb volume changes of the phase change material 27.

The heat retarding arrangement 2 can be, for example, glued to the bus bar 92; in an embodiment, with a heat-conducting adhesive. As an alternative or in addition, the heat retarding arrangement 2 can be held at the bus bar 92 by suited external fastening devices, for example locking elements or tie wraps.

In particular in case of the fastening by external fastening devices, between the heat retarding arrangement 2 and the bus bar 92, at least one heat conducting element can be arranged between the bus bar 92 and the heat retarding arrangement 2 for a better heat transfer. The heat conducting element can in particular be a layer of heat conducting paste or a heat conducting pad. The above-mentioned heat conducting adhesive is also considered as heat conducting element.

Figure 11:
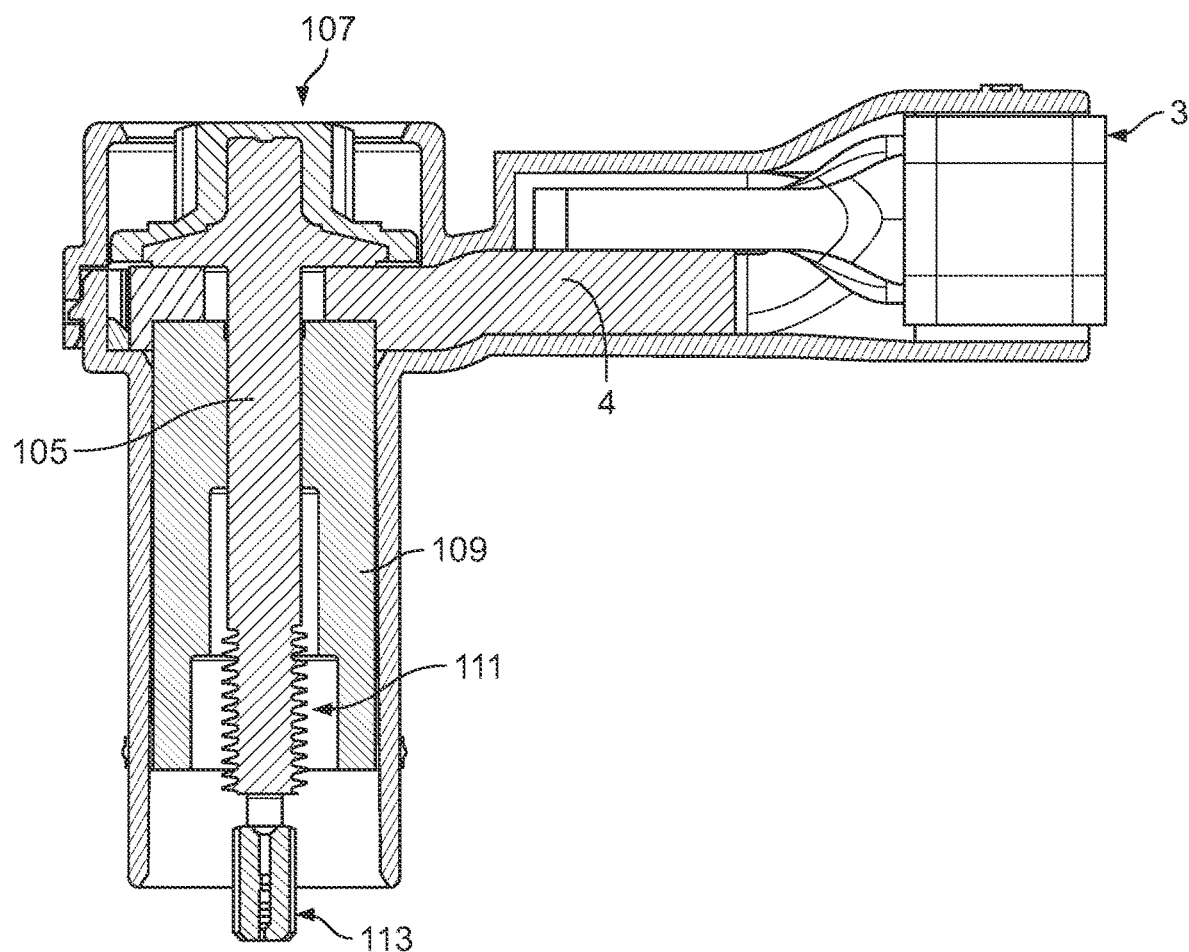
FIG. 11 is a sectional side view of a heat retarding arrangement according to an embodiment in a screw of a bolted connection.

The heat retarding arrangement 2 can be configured as a screw 105 for interconnecting two electrical conductors 4. This type of connection, that is also known as bolted connection, is shown in FIGS. 11 to 13.

The screw 105 is configured to connect a conductor 4, which can be part of a cable 3, to another conductor. The screw 105 has a screw head 107 for driving the screw 105 and for pressing the conductor 4 against the other conductor. The screw head 107 may be electrically insulated for providing touch protection.

Between the conductor 4 and the other conductor, one or more intermediate pieces 109, such as a sleeve or a bushing, may be arranged. In order to produce a pressing force and to fixate the screw 105, the screw 105 is provided with a screw thread 111 at an end that is opposite to the screw head 107. At the end of the screw 105 that is provided with the screw thread 111, the screw 105 may further be provided with an electrically insulated tip 113. The insulated tip 113 may increase the safety when mounting the screw 105.

Typically, the screw 105 itself only plays a minor role for conducting a current. Instead, the screw 105 is intended to mechanically fixate the electrically conductive parts with each other. However, the screw 105 also heats up when being in contact with hot electrically conductive parts, such as the conductor 4 or the intermediate piece 109.

In order to reduce the heat in the screw 105 and the conductors, the screw 105 can be provided with at least one cavity 93. Inside the cavity 93, phase change material 27 can be arranged. The cavity 93 for the phase change material 27 can be arranged at different positions in the screw 105. In the embodiment shown in FIG. 12, the cavity 93 is arranged close to the screw head 107. The cavity 93 can be formed during the manufacturing process of the screw 105 in the region of the screw head 107. Afterwards, the cavity 93 can be filled with phase change material 27. Finally, the cavity 93 can be closed with a cap 95 or other elements.

In FIG. 13, an arrangement is shown that differs from the arrangement described above with respect to FIG. 12. Here, the cavity 93 extends at the opposite end of the screw 105. The cavity 93 opens from the tip of the screw 105 into the material of the screw 105, thus extending in the region of the screw thread 111.

The cavity 93 may be formed during manufacturing of the screw 105 when an opening 115 for receiving parts of the insulated tip 113 is formed. After forming the opening 115 and the cavity 93, the cavity 93 may be filled with phase change material 27. The cavity 93 may be closed with a cap 95. Afterwards, the insulating tip 113 can be inserted into the opening 115 in order to fixate the same to the screw 105. In the alternative, the cap 95 may be omitted if the insulated tip 113 is sufficient for closing the cavity 93 when arranged inside the opening 115.

In the following, further arrangements are described that can benefit from the advantages of the heat retarding arrangement 2 according to the invention. In the following, a heat transfer arrangement 117 is described with respect to FIGS. 14 and 15.

Figure 14:
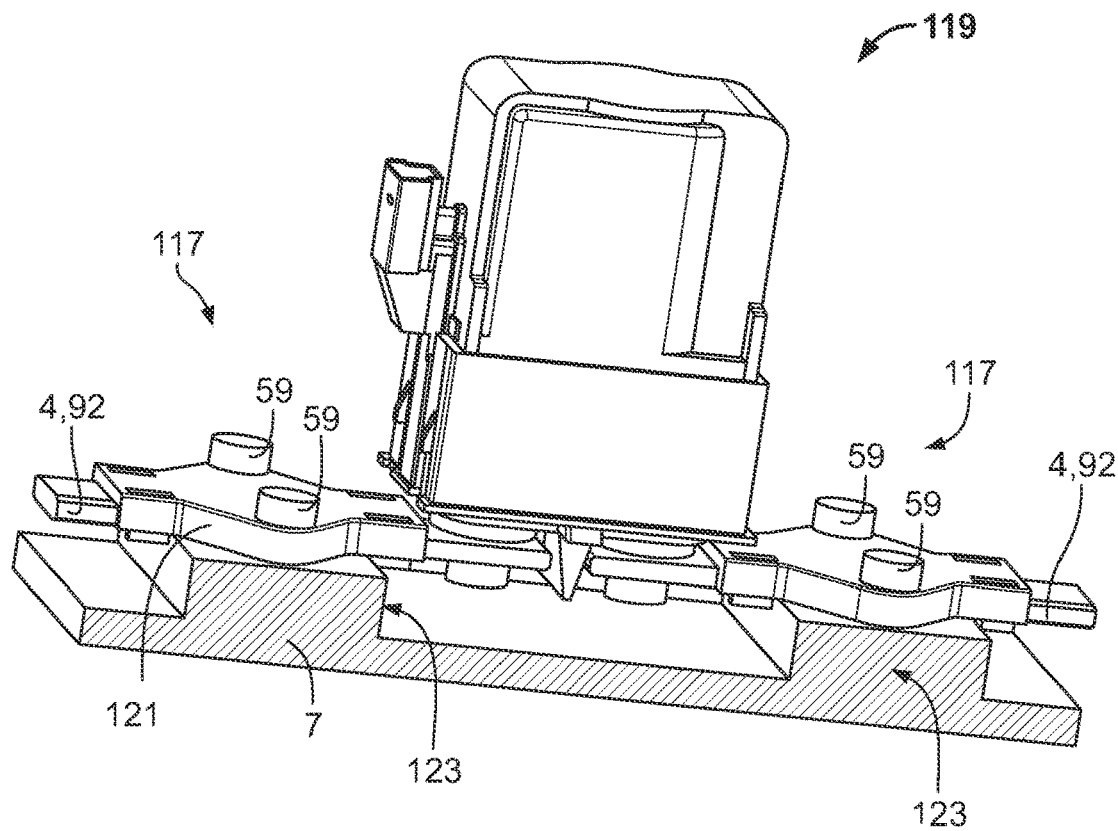
FIG. 14 is a heat transfer arrangement according to a first embodiment for fixing a bus bar to a vehicle.

In FIG. 14, two heat transfer arrangements 117 are shown. For the sake of brevity, only one of the heat transfer arrangements 117 is described in the following. Just by way of example, the bus bars 92 shown in FIG. 14 can be connected to a relay 119.

The heat transfer arrangement 117 is intended to connect a conductor 4, in particular a bus bar 92, to a solid structure, in particular to a part 7 of a vehicle 5. The heat transfer arrangement is intended to connect the bus bar 92 in an electrically insulating manner to the part 7, but, at the same time, to allow heat to be transferred from the bus bar 92 to part 7.

The heat transfer arrangement 117 comprises a hold down device 121 that can be arranged on top of the bus bar 92 and to receive the bus bar 92 at least in parts. The term "on top" refers to a side of the bus bar 92 that is opposite to the part 7, to which the bus bar 92 is attached by the arrangement 117.

In order to improve the connection between the hold down device 121 and part 7 of the vehicle, a protrusion 123 can be formed in part 7 as a counterpart to the hold down device 121. The bus bar 92 can be arranged on top of the protrusion 123. The hold down device 121 can be arranged on top of the bus bar 92. Thereby, the bus bar 92 can be received between the protrusion 123 and the hold down device 121.

The hold down device 121 may have a receptacle 125 for receiving the bus bar 92 in a way that leaves only one side 127 of the bus bar open for being in contact to part 7. The hold down device 121 may be fixated via screws 59 to part 7. In order to electrically insulate the bus bar 92 form part 7, an intermediate layer 129 may be arranged between the bus bar 92 and part 7.

The intermediate layer 129 may be an electrically insulating material with a high thermal conductivity. The intermediate layer 129 may be formed as a plate between the bus bar 92 and part 7, as a foil, which is at least partially wrapped around the bus bar 92 or as a coating on the surface of the bus bar 92.

Figure 15:
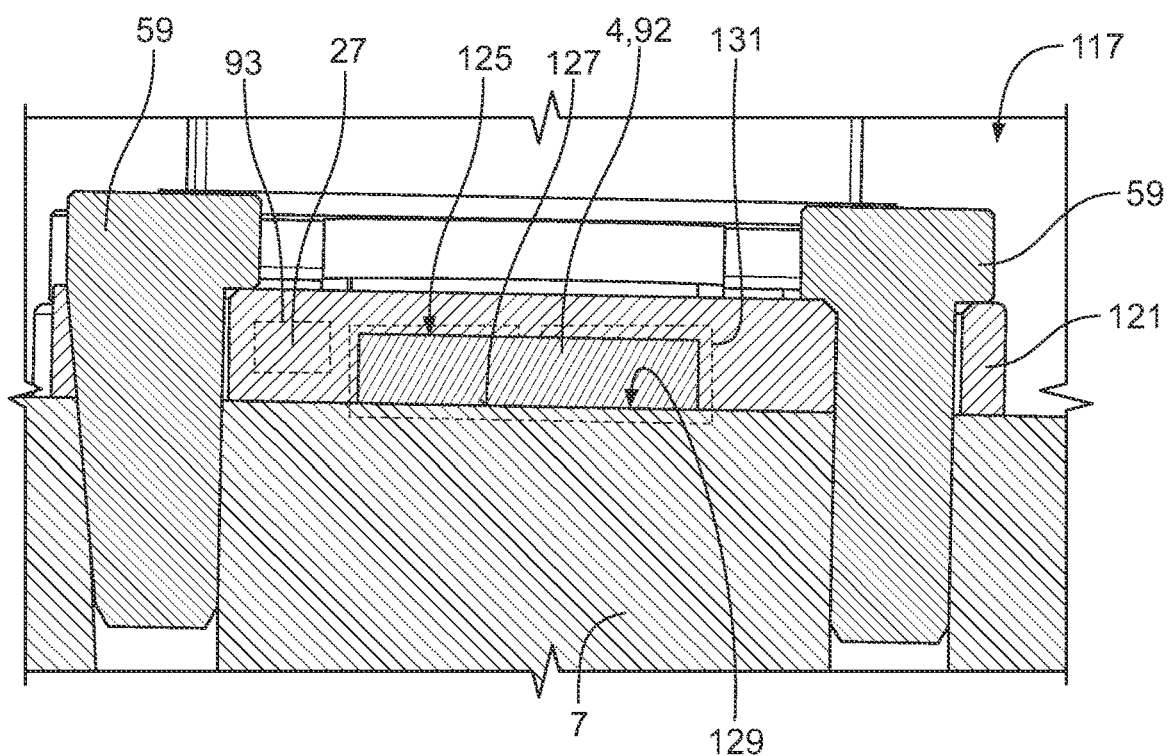
FIG. 15 is a detail sectional view of the heat transfer arrangement of FIG. 14.

Just by way of example, a foil 131 is indicated by dashed lines in FIG. 15, the foil 131 extending around the circumference of the bus bar 92. The foil 131 does not necessarily need to cover the whole surface of the bus bar 92. This is shown in FIG. 15, where a region on top of the bus bar 92 is not covered by the foil 131.

In the arrangement described above, the hold down device 121 can comprise phase change material 27. However, this is not mandatory. The heat transfer arrangement 2 for fixating the bus bar 92 to the vehicle 5 does not necessarily need to comprise the phase change material 27. Any one of the adapter, the hold down device 121 and the intermediate layer 129 may comprise a phase change material 27 or may be made of a phase change material 27.

Just by way of example, a cavity 93 containing phase change material 27 is shown in the cross-sectional view of FIG. 15, As already mentioned, this is only optional. The phase change material 27 may improve the heat transfer away from the bus bar 92, in particular at those sections of the bus bar 92 that are not in direct contact with part 7.

Subsequently, the heat may be transferred by the hold down device 121 to part 7. Additionally or in the alternative, the intermediate layer 129 may comprise or may be made of phase change material 27. As a further alternative, a further layer may be provided between the bus bar 92 and part 7 that provides phase change material 27 for heat retardation.

Figure 16:
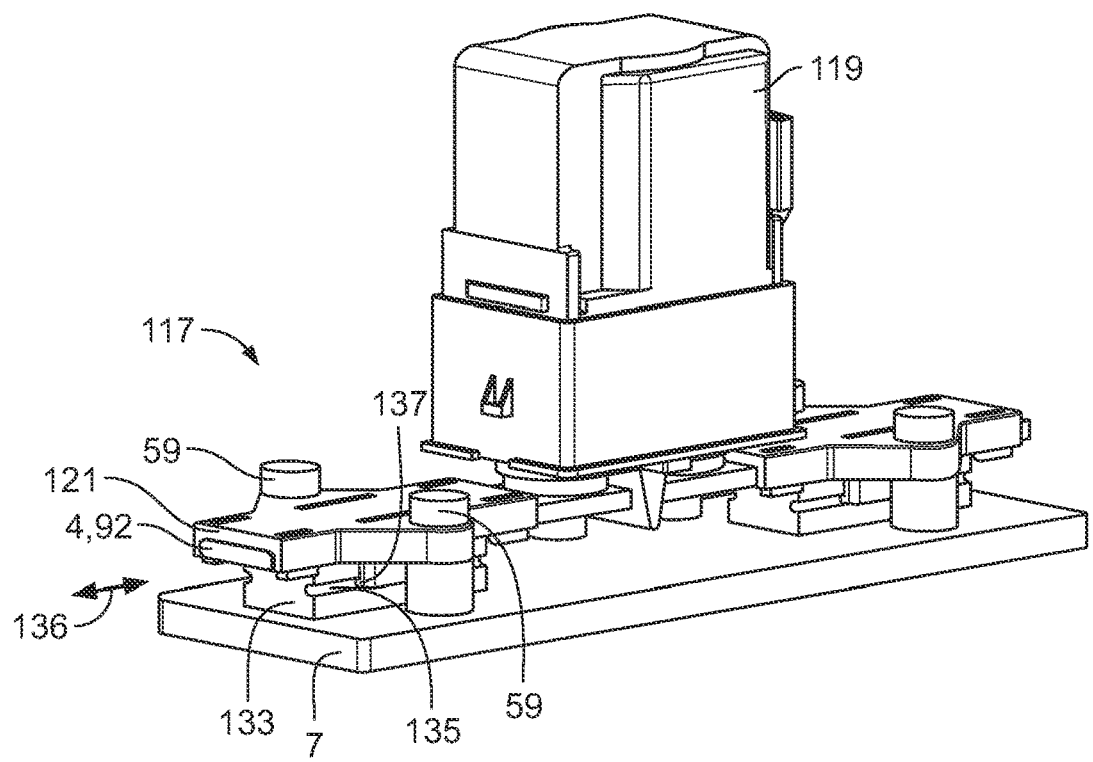
FIG. 16 is a heat transfer arrangement according to a second embodiment for fixing a bus bar to a vehicle.
Figure 17:
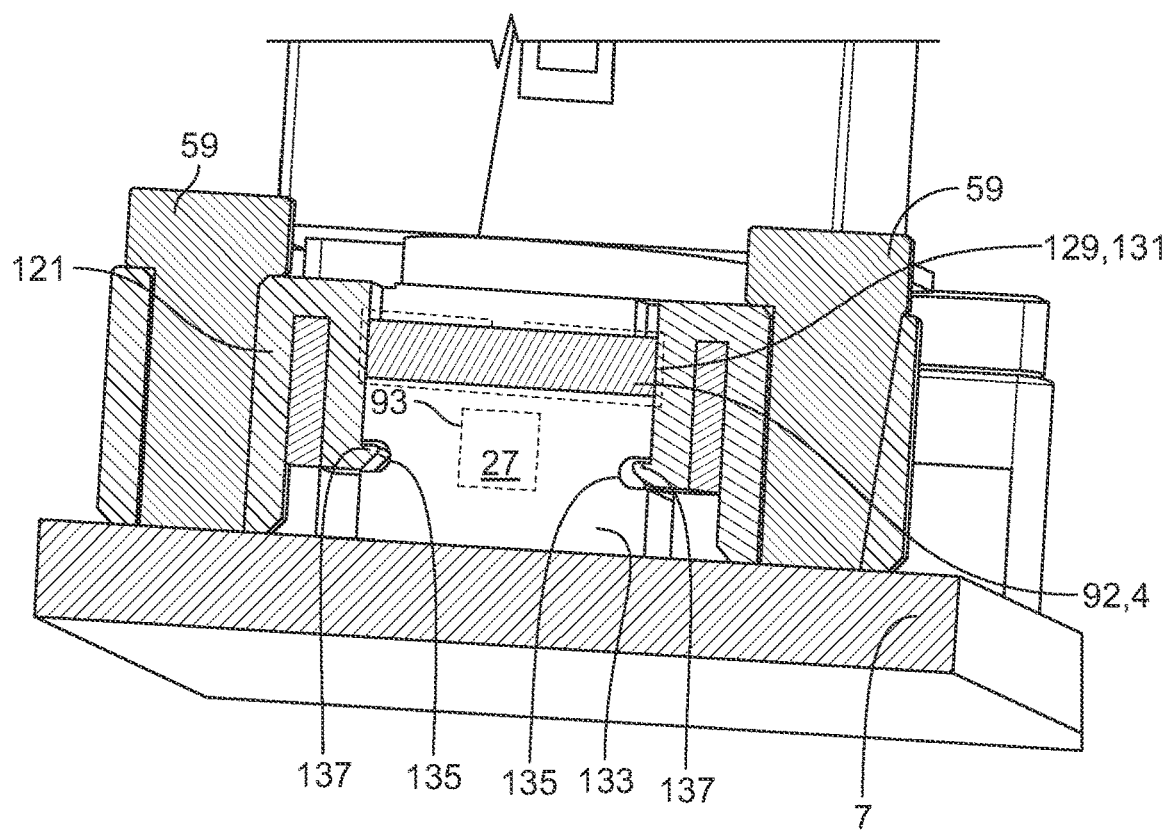
FIG. 17 is a detail sectional view of the heat transfer arrangement of FIG. 16.

In the following, a second embodiment of the heat transfer arrangement 117 is described with respect to FIGS. 16 and 17. For the sake of brevity, only the differences to the embodiment described with respect to FIGS. 14 and 15 are described. The second embodiment of the heat transfer arrangement 117 can be advantageous in a case in which a part 7 is not provided with a protrusion 123.

In order to allow the bus bar 92 to be connected to part 7 in a satisfactory manner, namely heat conducting, but electrically insulating, the heat transfer arrangement 117 comprises an adapter 133 that may serve for the same purpose as the protrusion 123 described with respect to the first embodiment. The bus bar 92 is arranged between the hold down device 121 and the adapter 133.

In order to fixate the hold down device 121 and the adapter 133 to each other, the adapter 133 may be provided with latching grooves 135 on two opposing sides for receiving latching hooks 137 of the hold down device 121. The latching grooves 135 may extend parallel with a longitudinal direction 136 of the bus bar 92.

The adapter 133 may be made of an electrically insulating material. However, this is not mandatory. The adapter 133 may be made from a metal material, in particular aluminum, in order to improve the heat transfer from the bus bar 92 to part 7.

In particular in a case in which the adapter 133 is made of a metal, an intermediate layer 129 may be provided between the bus bar 92 and the adapter 133. The intermediate layer 129 may be a foil 131 wrapped around the bus bar 92.

As also in the first embodiment, the second embodiment of the heat transfer arrangement 117 may be provided with a phase change material 27. As already mentioned above, the hold down device 121 and/or the intermediate layer 129 may be provided with phase change material 27. Furthermore, the adapter 133 may provided with phase change material 27, in particular inside at least one cavity 93 formed in the adapter 133 (indicated by dashed lines in FIG. 17).

Figure 18:
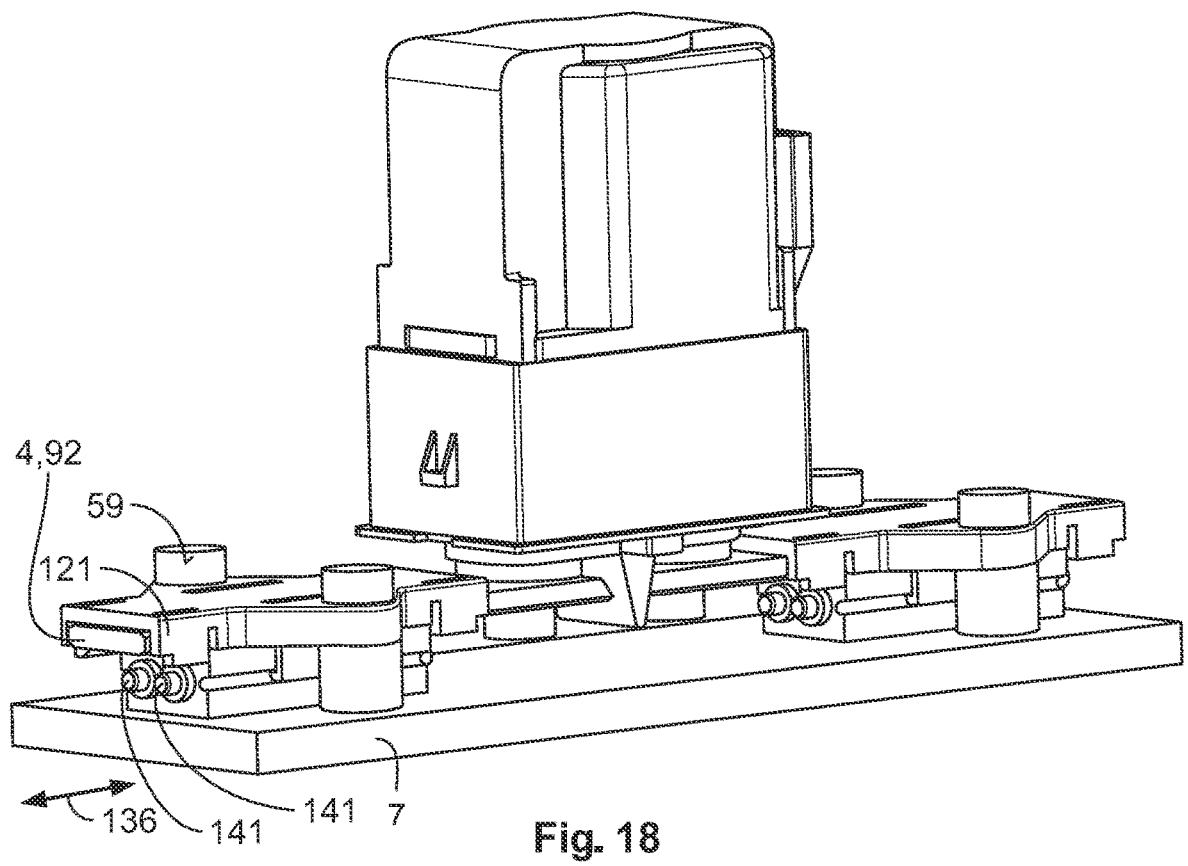
FIG. 18 is a heat transfer arrangement according to a third embodiment for fixing a bus bar to a vehicle.
Figure 19:
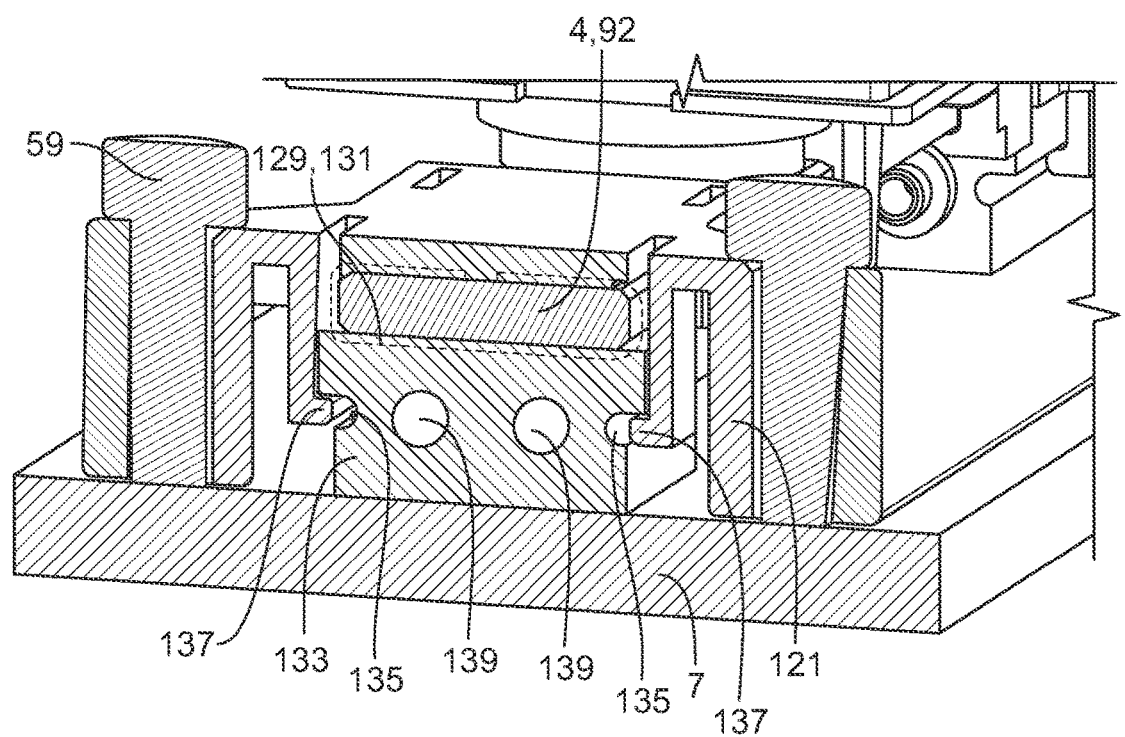
FIG. 19 is a detail sectional view of the heat transfer arrangement of FIG. 18.
Figure 20:
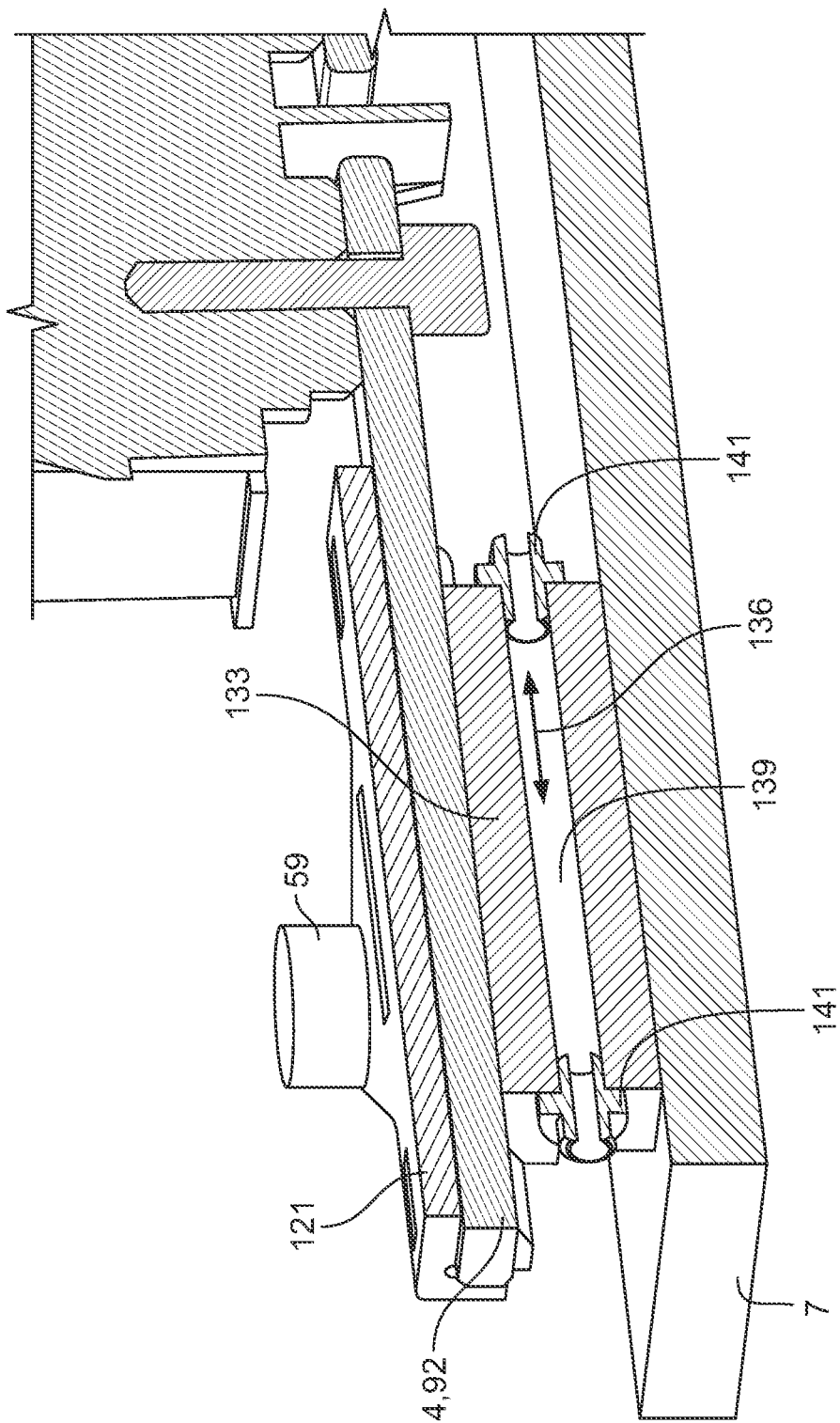
FIG. 20 is another detail sectional view of the heat transfer arrangement of FIG. 18.

Now, reference is made to FIGS. 18 to 20, in which a third embodiment of a heat transfer arrangement 117 is shown. Again, only the differences to the embodiments shown before are described in detail. The third embodiment of the heat transfer arrangement 117 is basically similar to the second embodiment except for two cooling channels 139 extending through the adapter 133.

The cooling channels 139 may extend parallel with a longitudinal direction 136 of the bus bar 92. The cooling channels 139 can be used for actively cooling the adapters 133. To do so, the cooling channels 139 may be part of a cooling circuit through which a coolant flows in order to transfer heat away from the adapter 133. At the ends of the cooling channels 139, connecting pieces 141 can be provided for facilitating the connection of the cooling channels 139 to other parts of a cooling circuit, such as tubes. The third embodiment of the heat transfer arrangement 119 may optionally be provided with phase change material 27.

What is claimed is:

1. A heat retarding arrangement, comprising:
    a phase change material attachable at or in an electric conductor and passively cooling the electric conductor;
    a cable receiving section including an opening formed therethrough adapted to receive the electric conductor, the phase change material arranged around the opening of the cable receiving section for surrounding the electric conductor;

a heat accumulator body containing the phase change material and defining the cable receiving section; and a cable received in the cable receiving section, the cable has an inner conductor, an inner insulation surrounding the inner conductor, a shield surrounding the inner insulation, and an outer insulation surrounding the shield, the shield is exposed in a section of the cable, the heat accumulator body abuts against the shield in the section of the cable.

2. The heat retarding arrangement of claim 1, further comprising a housing in which the phase change material is disposed.

3. The heat retarding arrangement of claim 2, wherein the housing is made of a plastic, a composite material, a silicone material, and/or a metal.

4. The heat retarding arrangement of claim 2, wherein the housing is expandable in a rubber-elastic manner.

5. The heat retarding arrangement of claim 1, further comprising a heat accumulator body having a plurality of spaces containing the phase change material.

6. The heat retarding arrangement of claim 1, further comprising a passive cooling structure.

7. The heat retarding arrangement of claim 1, further comprising a heat conducting element abutting against the electric conductor, a cable including the electric conductor, or a part of a vehicle.

8. The heat retarding arrangement of claim 1, further comprising a temperature sensor.

9. The heat retarding arrangement of claim 1, wherein the phase change material contains sodium and/or paraffin.

10. The heat retarding arrangement of claim 1, wherein the heat retarding arrangement is a cable clip fastening a cable including the electric conductor at an electric vehicle.

11. The heat retarding arrangement of claim 10, wherein the cable clip has the cable receiving section receiving the cable and an abutment section abutting against a part of the vehicle.

12. The heat retarding arrangement of claim 11, wherein the cable clip includes a heat accumulator body with the phase change material, the heat accumulator body conducts heat from the cable receiving section to the abutment section.

13. The heat retarding arrangement of claim 1, wherein the heat accumulator body includes a frame structure defining a plurality of spaces containing the phase change material, the plurality of spaces arranged around the cable receiving section and adapted to surround the electric conductor.

14. The heat retarding arrangement of claim 13, wherein the frame structure is formed from a foamed material.

15. A heat retarding arrangement, comprising:
a phase change material attachable at or in an electric conductor and passively cooling the electric conductor;
a cable receiving section including an opening formed therethrough adapted to receive the electric conductor, the phase change material arranged around the opening of the cable receiving section for surrounding the electric conductor;
a heat accumulator body containing the phase change material and defining the cable receiving section; and
a cable received in the cable receiving section, the cable has an inner conductor, an inner insulation surrounding the inner conductor, a shield surrounding the inner insulation, and an outer insulation surrounding the shield, the heat accumulator body abuts against the outer insulation of the cable.

16. An arrangement, comprising:
a cable clip adapted to fasten a cable including an electric conductor at an electric vehicle, including:
  a phase change material attachable at or in the electric conductor and passively cooling the electric conductor;
  a cable receiving section receiving the cable and an abutment section abutting against a part of the vehicle, the cable receiving section including an opening formed therethrough adapted to receive the electric conductor, the phase change material arranged around the opening of the cable receiving section for surrounding the electric conductor; and
  a heat accumulator body with the phase change material, the heat accumulator body conducts heat from the cable receiving section to the abutment section;
a part of a vehicle; and
a cable including an electric conductor, the cable clip is fixed to the part of the vehicle and abuts against the part of the vehicle with the abutment section, the cable is received in the cable receiving section of the cable clip.

* * * * *